US 6,693,984 B1

(12) United States Patent
Andre

(10) Patent No.: US 6,693,984 B1
(45) Date of Patent: Feb. 17, 2004

(54) METHOD AND APPARATUS FOR COMPENSATING FOR INTERSYMBOL INTERFERENCE IN A RECEIVED SIGNAL

(75) Inventor: Tore Andre, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 640 days.

(21) Appl. No.: 09/650,405

(22) Filed: Aug. 29, 2000

(51) Int. Cl.$^7$ ................................................. H04B 1/10
(52) U.S. Cl. ........................................ 375/350; 375/348
(58) Field of Search ................................. 375/224, 285, 375/346, 348, 349, 350, 229, 232, 342

(56) References Cited

U.S. PATENT DOCUMENTS

| 5,285,480 A | * | 2/1994 | Chennakeshu et al. ...... 375/348 |
| 5,353,307 A | * | 10/1994 | Lester et al. .................. 375/233 |
| 5,809,086 A | * | 9/1998 | Ariyavisitakul ............. 375/332 |
| 5,991,349 A | * | 11/1999 | Chen ........................... 375/355 |
| 6,377,632 B1 | * | 4/2002 | Paulraj et al. ............... 375/299 |

FOREIGN PATENT DOCUMENTS

| DE | 198 58 106 | 6/2000 |
| WO | 99/44326 | 9/1999 |

OTHER PUBLICATIONS

"Residual ISI Cancellation for OFDM with Application s to HDTV Broadcasting", D. Kim and G. Struber, IEEE Journal on Selected Areas in Communications, vol. 16, No. 8, Oct. 1998.
Dukhyun Kim, Stüber "Residential ISI Cancellation for OFDM with Applications to HDTV Broadcasting" IEEE Journal on Selected Areas in Communication s , vol. 16, No. 8, Oct. 1998, pp. 1590–1599.

Oppenheim, Schafer, "Discrete–Time Signal 7,20 Processing", 1989, Prentice Hall, Englewood Cliffs, New Jersey, U.S., pp. 300–313.

Viterbo, Fazel, "How to combat long echoes in OFDM transmission schemes: sub–channel equalization or more powerful channel coding" IEEE Global Telecommunications Conference Nov. 13–17, 1995, pp. 2069–2074.

* cited by examiner

Primary Examiner—Jean B. Corrielus

(57) ABSTRACT

A method and arrangement are proposed for compensating for intersymbol interference (ISI) in a multi-carrier transmission system. Compensation is based on the generation of an estimate of the ISI transient tail generated between consecutively transmitted symbols and subtracting this tail from the received signals. Each symbol includes a cyclic extension as prefix. The tail is generated from a tail portion isolated from the cyclic prefix. This tail portion is then used in a filter arrangement adapted to generate at least an estimate of the full transient signal. The filter function may be proceeded by a processing module for generating the initial conditions of the filter function from the transient signal portion. The full transient is then generated by inputting a predetermined value into the filter function. The processing module may be a second filter or processing arrangement adapted to perform calculations. The filter function may alternatively be an adaptive filter function that generates a full transient from the transient portion. The adaptive filter may be configured prior to use with a training sequence. Alternatively, or in addition, the adaptive filter function may also be adjusted using each received symbol to generate an error update signal.

23 Claims, 4 Drawing Sheets

METHOD AND APPARATUS FOR COMPENSATING FOR INTERSYMBOL INTERFERENCE IN A RECEIVED SIGNAL

BACKGROUND

The invention relates to multi-carrier digital transmission systems and has particular relevance to discrete multi-tone or orthogonal frequency division multiplexed systems for use over digital subscriber lines or radio broadcast systems.

Digital subscriber line technologies, commonly termed xDSL enable high-speed digital data to be transmitted down an ordinary phone line. The modulation scheme standardised for asymmetric DSL (ADSL) and proposed for very high speed DSL (VDSL) is discrete multi-tone modulation DMT. In this scheme, several carriers are quadrature amplitude modulated (QAM) at the same time and added together. Modulation can be achieved by performing an inverse fast Fourier transform (IFFT), with fast Fourier transform (FFT) used for demodulation. The output from one IFFT calculation is termed a discrete multi-tone symbol and is sent over the channel after conversion to an analogue signal. A problem with normal telephone lines, which often comprise a simple twisted pair, is the frequency dependent attenuation and phase shift of a transmitted signal which result in the time dispersion or spread of the signal in time. This manifests itself as interference between adjacent symbols as one symbol is spread into a following symbol. The interference in one symbol is a combination of the interference due to a previously transmitted symbol, which is correctly termed the intersymbol interference ISI, and the interference due to the symbol itself, or the intercarrier interference. For the purposes of this document, no distinction will be made between the sources of the interference, and the term intersymbol interference or ISI will be used to designate the total interference experienced by a symbol. ISI can be viewed as a transient or decaying 'tail' generated at the discontinuity where consecutive symbols meet. Conventionally, the effects of ISI are mitigated by providing a guard interval in front of each symbol. The guard time typically contains a cyclic extension of the symbol. Specifically, a copy of the end of each symbol is added to the beginning of the symbol in the form of a cyclic prefix. The carriers are continuous from the beginning of the cyclic prefix to the end of the symbol. Thus any interference will be generated at the discontinuity between the start of the cyclic prefix and the end of the previous symbol. The lengths of cyclic prefixes vary according to the application, but typically consist of no more than 10% of the symbol. Longer guard intervals are unfavourable because they introduce a bandwidth penalty. If the dispersion on the channel is not too severe, the ISI transient generated at the boundary between symbols will terminate within the cyclic prefix, leaving the subsequent symbol intact. However, the impulse response of the channel, which includes the effects of filters in the transmitter and receiver, can be very long, and often exceed the guard interval. Residual intersymbol interference will then occur which can severely impair the quality of the received signals.

In the article "Residual ISI Cancellation for OFDM with Applications to HDTV Broadcasting" D. Kim and G. Stüber, IEEE Journal on Selected areas in Communications Vol. 16, No. 8, October 1998, a technique for cancellation of residual ISI is discussed. An algorithm is proposed for removing the interference generated between consecutive symbols transmitted on a channel. This includes the interference caused by the previous transmitted symbol, i.e. the inter-symbol interference (ISI), and the disturbance due to symbol itself, i.e. the inter-carrier interference (ICI). The determination of interference requires knowledge of the transmitted symbols. This is achieved by making decisions about the transmitted symbols utilising the received, decoded symbols that have been corrupted by the channel, with knowledge of the channel response. The estimated symbols are then converted back to the time domain using IFFT, and the ISI determined and removed using the algorithm. The residual symbol is then reconverted to the frequency domain using FFT and the decisions made. An iterative process then follows to remove the ICI. Since the decisions on the transmitted symbols may initially be erroneous, an iterative process is required to accurately determine the interference. This necessarily entails a very large number of calculations, so that the process as a whole demands very high processing power.

Time domain equalizers TEQ are also used in the art to mitigate the effects of ISI between symbols transmitted over a distorting channel. A time domain equalizer is constituted by a filter, generally a finite impulse response (FIR) filter and has the effect of shortening the impulse response of the channel. This can be achieved, for example, by cancelling the poles in the channel transfer function. By using a suitable algorithm, the channel impulse response can be made shorter than the cyclic prefix utilised. However, a drawback of TEQs is that both the noise and the signal are filtered. When a TEQ cancels the poles in the channel transfer function it will also attenuate some signal frequencies and amplify noise at other frequencies. The noise will leak into the side lobes of the fast Fourier transform in the receiver and degrade performance. Hence adapting the TEQ to minimise ISI will generally result in a sub-optimal signal to noise ratio.

There is thus a need for a system that reliably mitigates the effects of intersymbol interference while leaving signal information undisturbed but is simple enough to be implemented in a wide range of applications.

SUMMARY OF INVENTION

In a multi-carrier transmission system wherein digital symbols including a cyclic symbol prefix are transmitted over a transmission medium to a receiver, intersymbol interference is compensated for by generating an estimate of the ISI tail and subtracting this from the received signals. This is achieved by subtracting the symbol prefix from the beginning of each received symbol to obtain a portion of a transient intersymbol interference signal generated during transmission and using the transient portion with a filter function adapted to generating an estimate of the full transient signal. This transient signal is then subtracted from the received symbol to correct the same. The filter function may be preceded by a processing arrangement for generating the initial conditions of the filter function. The filter function is then used to generate the full transient signal when input with a predetermined value. The processing arrangement may be a second filter or be adapted to perform calculations.

The filter function may alternatively be an adaptive filter function that is configured prior to use with a training sequence. The adaptive filter function may also be adjusted using each received symbol to generate an error update signal.

The specific compensation for intersymbol interference in accordance with the invention means that the signal can be filtered separately to remove noise due to other sources in the normal way. This allows each process to be optimised without having a detrimental effect on the other. Moreover, the processing power required for this compensation is relatively small, since it requires the generation of a transient symbol using only the portion of the actual transient signal contained in the cyclic prefix and the cancellation of the interference by subtracting the generated signal from the beginning of the received symbol.

BRIEF DESCRIPTION OF THE DRAWINGS

Further objects and advantages of the present invention will become apparent from the following description of the preferred embodiments that are given by way of example with reference to the accompanying drawings. In the figures.

FIG, 4 schematically illustrates a first filter arrangement for use in the arrangement of FIG. 3.

DETAILED DESCRIPTION

Figure 1:
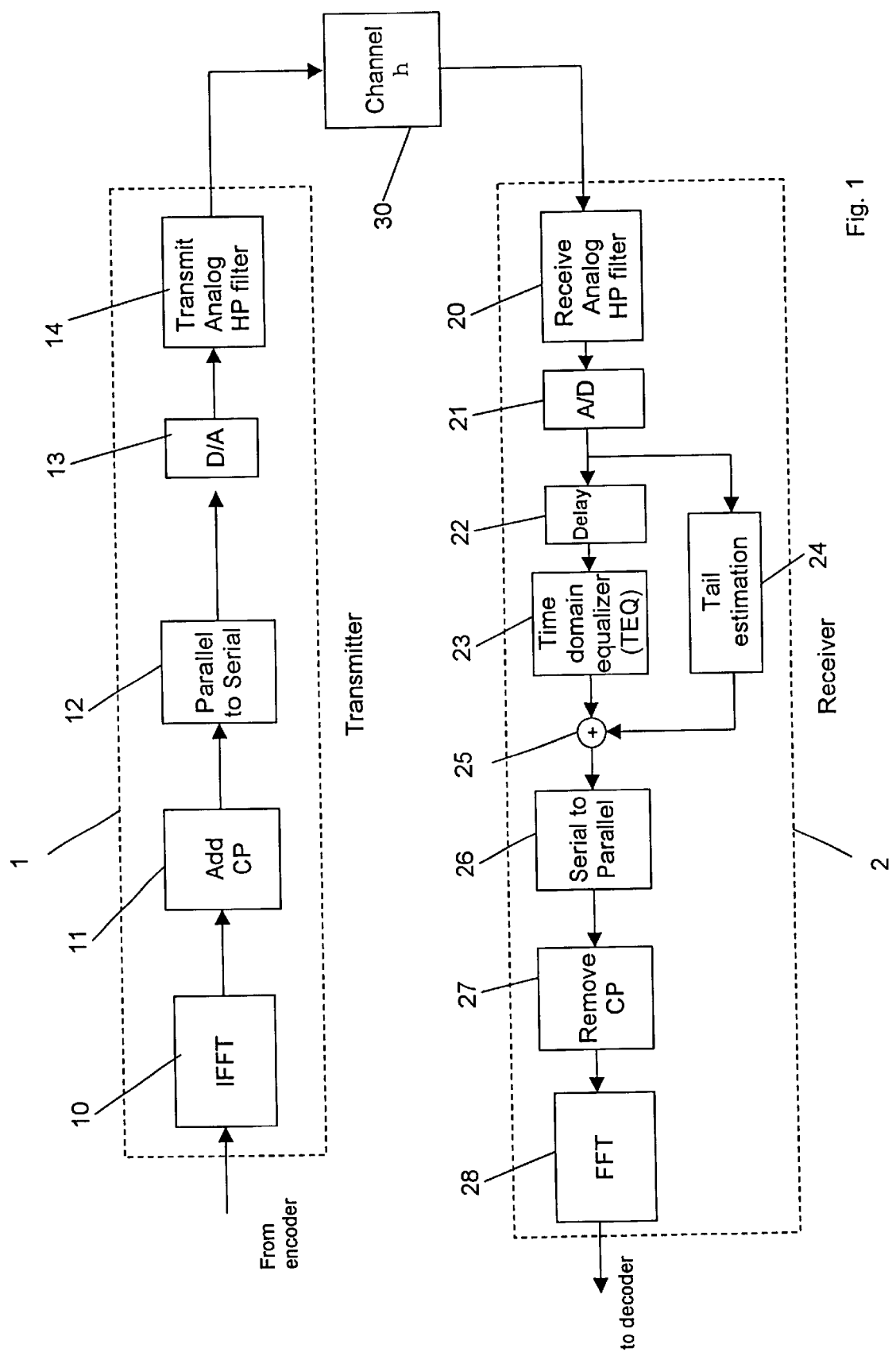
FIG. 1 schematically depicts a multi-channel transmission system including parts of transmitting and receiving portions of DMT xDSL modems modified according to the present invention.

FIG. 1 shows a block diagram representing part of an end to end link of a multi-carrier transmission system that uses discrete multi-tone modulation DMT with a transmitter 1 and receiver 2. In the present embodiment it is assumed that the link includes at least part of a normal telephone line, which may include a twisted pair phone line. However, it will be understood that this arrangement may be used for a variety of other transmission media, including broadcast radio, for example using orthogonal frequency division multiplexing (OFDM).

The transmitter 1 and receiver 2 depicted in FIG. 1 are preferably part of modems that support Digital Subscriber Line (DSL) transmission. Preferably these modems support either ADSL (asymmetric DSL) or VDSL (Very high-speed DSL) modulation schemes, or any of the other modulation schemes which fall under the collective term xDSL. However, it will be understood from the following description that the transmitter and receiver portions illustrated may be part of devices utilised for other applications, such as high definition television (HDTV) broadcast systems.

The transmitter 1 incorporates several components including an encoder (not shown), a discrete multi-tone modulator 10, a cyclic prefix adder 11 a parallel to serial converter 12, a digital to analogue converter 13 and an analogue transmitter with high-pass filter 14. The encoder is connected upstream of the discrete multi-tone modulator 10 and serves to translate incoming bit streams into in phase, in quadrature sequences for each of a plurality of sub-channels. These encoded sequences are input to the multi-tone modulator 10, which is preferably an IFFT modulator 10 that computes the inverse fast Fourier transform by an appropriate algorithm. The discrete multi-tone encoded symbols generated in the IFFT modulator 10 are then each cyclically extended by the addition of a cyclic prefix in CP circuitry 11. This is done by duplicating a number of samples at the end of a symbol and joining these to the beginning of the symbol. The number of samples included in the cyclic prefix depends on the application and acceptable bandwidth penalty. Typically a cyclic prefix does not exceed 10% of a symbol. The parallel symbol sequences are then converted to a serial sample stream in a parallel to serial converter 12. The serial sample stream is then converted to an analogue signal with digital to analogue converter 13, prior to transmission over the link by an analogue transmitter 14, which incorporates a high-pass filter for filtering out signals in the transmitter 1 that can interfere with the POTS band. The signal is then sent over the transmission medium denoted by a channel 30 having a transfer function 'h' to a remote location. At the receiver 2 positioned at the remote location, an analogue receiver 20, which also incorporates a high-pass filter for filtering out noise from the POTS band, receives the signal and inputs this into an A/D converter 21 for digital conversion. The digital bit stream is then sent to the ISI compensation block consisting of delay circuitry 22, a time domain equalizer (TEQ) 23, which may be a finite impulse response (FIR) filter, tail estimation circuitry 24 and an adder 25. This block will be described in more detail below, however it should be noted that the time domain equalizer 23 is optional in this arrangement. It serves to equalise the received signal, but is not necessary for reducing the ISI. The received symbols are then returned to parallel format in a serial to parallel converter 26. The cyclic prefix is discarded in CP removal circuitry 27 and the symbols are then demodulated in FFT circuitry 28 which performs a fast Fourier transform, and decoded by a decoder (not shown).

Figure 2A:
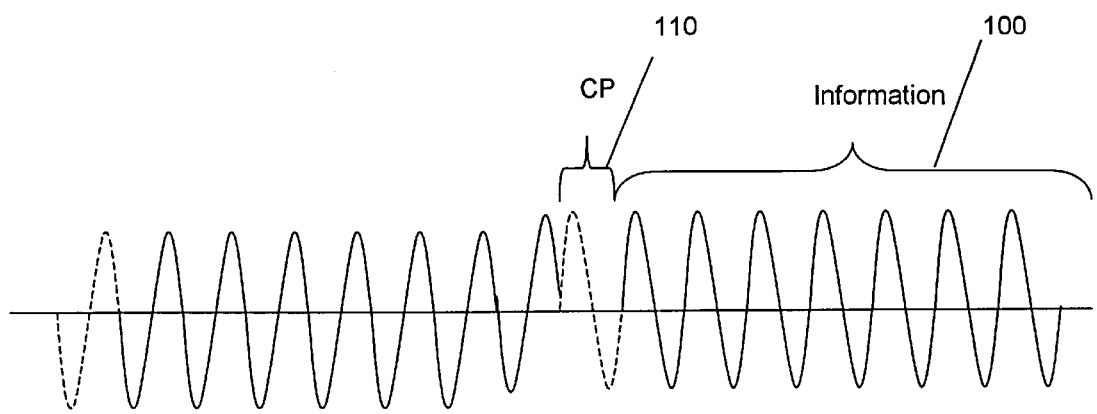
FIGS. 2a to 2b schematically illustrates the effects of intersymbol interference on a DMT signal.
Figure 2B:
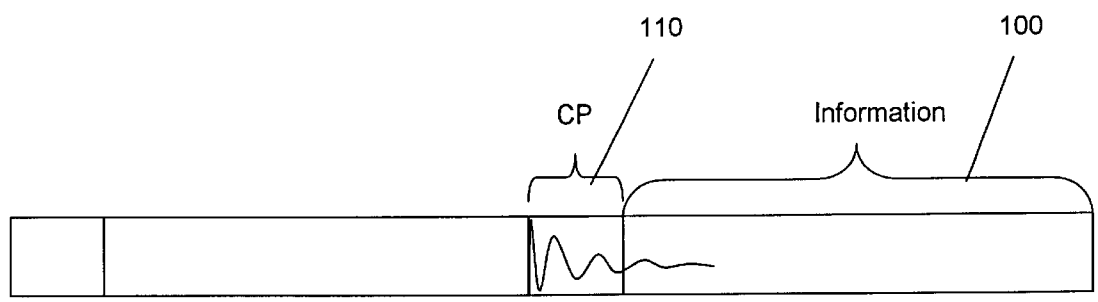

Turning now to FIG. 2 two consecutive DMT symbols transmitted over the distorting channel 30 are illustrated. For the purposes of illustration only one of the carriers of the DMT symbols is shown. Each symbol is made up of the DMT information-carrying portion 100, and a cyclic prefix CP 110. The information carrying portion is correctly the DMT symbol, however in the present embodiment, the information is always transmitted with a cyclic prefix so it is considered more appropriate to term the whole signal a symbol. The cyclic prefix 110 is constructed from a number of samples taken from the end of the information portion 100 and joined to the beginning of the information portion as a prefix. As is apparent from FIG. 2a, the carrier signal is continuous from the beginning of the cyclic prefix CP 110 to the end of the information portion 100. Conversely a discontinuity is present at the boundary between two DMT signals or rather between the end of the first information portion 100 and the beginning of the cyclic prefix 110 of the following symbol. When these signals are transmitted across the channel 30 the resultant signal dispersion or spread in time causes interference between the symbols at this boundary. This is illustrated in FIG. 2b wherein the information portion 100 and cyclic prefix 110 of a DMT symbol are represented as blocks. The interference between consecutive symbols manifests itself as a transient signal or 'tail' that originates at the discontinuity. The transient signal is present in the cyclic prefix CP 110, but also extends to greater or lesser extent into the DMT information-carrying portion 100 depending on the impulse response of the channel 30.

In accordance with the present invention, an estimate of this transient interference signal is generated at the receiver for each received symbol and subsequently used to substantially cancel out the transient in the received symbol. The corrected symbol can then be processed in the conventional manner to take account of noise that is present throughout the whole symbol. More specifically, the portion of the transient signal present in the cyclic prefix CP 110 is isolated and used to generate at least an estimate of the full transient signal. The cyclic prefix is a known sequence and in the present embodiment is a copy of a number of samples taken from the end of the information portion 100 of the symbol. The end portion of the received DMT symbol is in general not significantly affected by the intersymbol interference and can therefore be used to isolate the transient signal portion contained in the cyclic prefix 110 by subtraction from the latter. The generation of a full transient signal from the isolated transient signal portion is achieved using a filter system.

Figure 3:
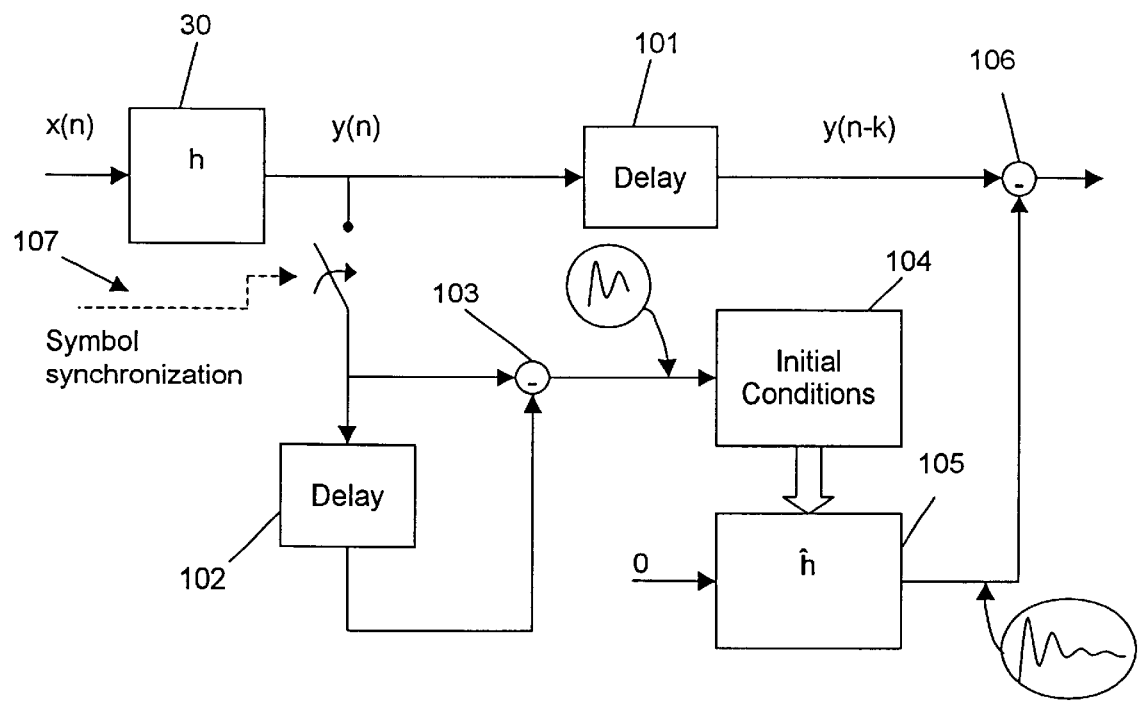
FIG. 3 shows a schematic arrangement for estimating and cancelling ISI at a receiver in accordance with one embodiment of the present invention.

FIG. 3 shows an arrangement for cancelling the intersymbol interference in accordance with a first embodiment of the present invention. This arrangement shows the DMT symbol x(n) entering the transmission medium or channel 30 and exiting as the received signal y(n). This received symbol is delayed in delay circuitry 101 by a period k to produce the symbol y(n−k). The period k is equivalent to the delay required to generate an estimate of the complete transient signal. The transient signal is then subtracted from the delayed received symbol y(n−k) in the adder 106 to obtain a DMT symbol with substantially no interference. The tail estimation circuitry is provided by a first switch 107 that represents symbol synchronisation. As each symbol is received across the channel 30, the switch 107 is initially closed to relay the beginning of the received symbol, that is the cyclic prefix CP 110 to the remaining tail estimation circuitry. The switch then opens until the last few samples of the symbol from which the cyclic prefix were formed at the transmitter arrive at the receiver, at which point it closes again. These final samples are then also passed on to the remaining tail estimation circuitry. This circuitry includes a delay element 102 which holds the extracted symbol bits CP bits for a time period that is equivalent to the delay required to transmit a full information portion 100, i.e. the time required to transmit a DMT symbol without the cyclic prefix 110. As the first bits of the final portion of the received symbol are conducted through the switch 107 the first bits of the cyclic prefix 110 will emerge from the delay element 102. These are then subtracted at the adder 103 to form a signal wherein the information content is substantially removed leaving only beginning of the transient signal as illustrated by the encircled signal curve. This transient signal portion is fed to a filter arrangement that comprises two processing modules 104, 105. The first module 104 uses the transient signal portion to calculate the initial conditions for the second module which is a filter 105. The filter 105 receives an input of zeros and generates an estimate of the complete transient signal with the programmed initial conditions.

The filter 105 has an impulse response that is an estimate of the impulse response of the channel 30. This estimated impulse response is denoted by $\hat{h}$. It is assumed that the channel impulse response h is known at the receiver. A number of methods exist for determining the transfer function h of any specific channel. In general a known sequence tx is employed, where t x is the sequence in the time domain and Tx is the known sequence in the frequency domain (the frequency domain is designated by upper case letters while the time domain is designated by lower case letters). One such method starts by determining the channel frequency response $\hat{H}$. Specifically, a received signal Rx is divided by the known transmitted signal Tx at each frequency in the frequency domain to determine the attenuation and phase shift representing the channel response in the frequency domain Hest. Conversion to the time domain to obtain the estimated channel impulse response $\hat{h}$ is accomplished by calculating the inverse fast Fourier transform of the determined frequency response $\hat{H}$.

A further method is outlined in the article "Residual ISI Cancellation for OFDM with Applications to HDTV Broadcasting" D. Kim and G. Stüber, IEEE Journal on Selected areas in Communications Vol. 16, No. 8, October 1998.

If the filter 105 is provided with the same initial conditions as the channel in the transition from one symbol to the next and the input to the filter is zero, the output of the filter 105 will be the full transient signal or tail.

The initial condition for the filter 105 can be calculated in the first processing module 104 from the first samples of the transient signal or tail using reversed difference equations. If the channel can be modelled as a function h(z) of degree M, then M−1 samples are necessary to calculate the initial conditions. If M−1 is less than the length of the cyclic prefix it is possible to calculate the initial conditions. Naturally, the samples used should ideally be free from noise. This is usually not the case, however a good approximation of the transient signal is nevertheless obtainable.

In a first embodiment of the present invention, the first processing module 104 is a filter that models the inverse response of the poles of the channel response to generate the initial conditions for the transient generating filter 105. For example, when the channel response is represented by h(z)=b(z)/a(z), then the initial conditions filter 104 has an impulse response f(z)=a(z). This is a finite impulse response (FIR) filter. The output of this filter is used to initialise filter 105 as will be described below. When the transfer function of the initial condition filter 104 is equivalent to f(z)=a(z), the transfer function of the tail filter 105 is a model of the poles in the impulse response of the channel 30. This filter thus has the transfer function g(z)=1/a(z). This filter 105 is an infinite impulse response (IIR) filter of a transposed direct form II structure. The arrangement including the initial condition filter 104 and the transient generating filter 105 is illustrated in FIG. 4.

Figure 4:
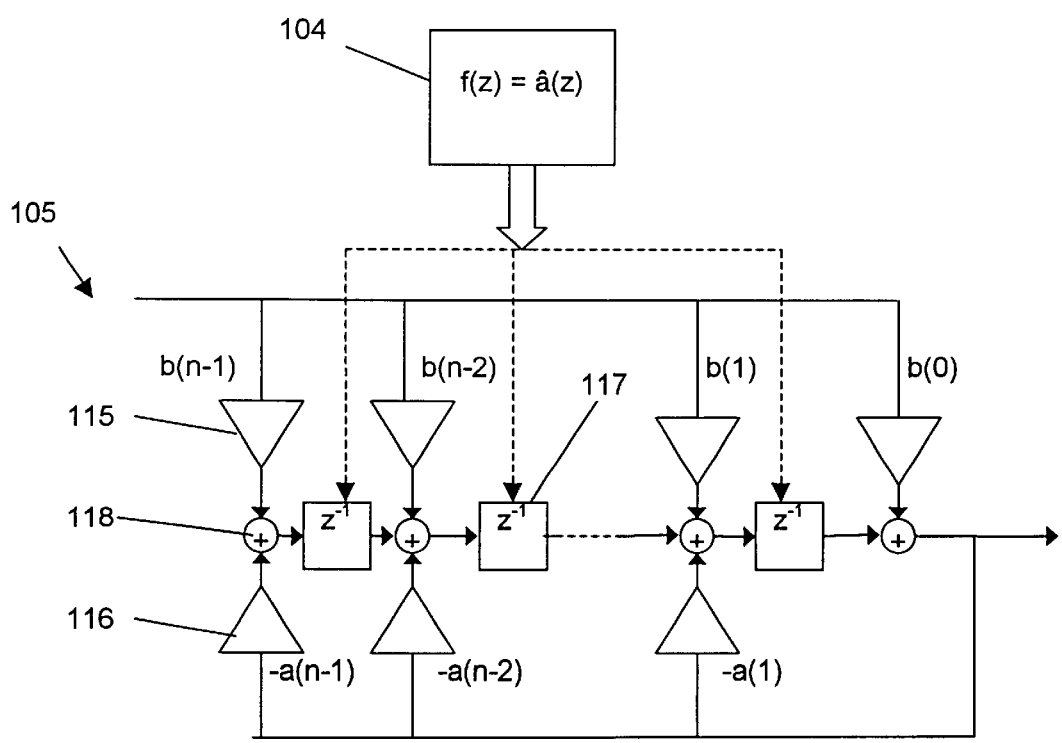

In FIG. 4 the filter 104 is shown schematically as a block with transfer function f(z)=â(z). Suitable designs for a FIR filter with this impulse response are generally known in the art and will not be discussed here. The filter 105 is depicted as a standard transposed direct form II filter with coefficient factors 115 and 116 for the zero and pole coefficients, respectively. The filter 105 includes a feed forward path for the input of zeros, which passes through each of the coefficient factors 115 and summing elements 118. It will be understood that for the transfer function g(z)=1/â(z) the coefficients in the feed forward path have no effect and may take any value or even be removed entirely. A feedback path is also included starting from the output of the last summing element 118 and passing through each of the pole coefficient factors into the summing elements 118. Each summing element 118 is separated from the next by a delay element 117. The output of the initial condition filter 104, illustrated schematically by dashed arrows is used to program the delay elements 117 and so initialise the filter 105.

In FIG. 4 the filter 105 is shown with coefficients for both the poles a and zeros b. However, the coefficients b are not required and could be set at any random value or suppressed completely. The zeros of the channel b(z) are effectively included in the programmed initial condition and do not have to be taken care of especially in the transient generating filter 105.

The embodiment described with reference to FIG. 4 provides an acceptable approximation of the transient signal with low complexity. Other filter structures may be better in terms of sensitivity to small errors in the coefficient values or in the initial condition. It will be understood that when a different filter structure is used than the transposed direct form II structure illustrated in FIG. 4, then the initial condition must also be changed and adapted to the modified structure.

In accordance with a further embodiment of the present invention a finite impulse response (FIR) filter is used as the transient generating filter 105. This filter 105 has a transfer function g(z) that approximates the channel response h(z). Assuming as before that the channel transfer function h(z) is equal to b(z)/a(z), the transfer function of this filter 105 satisfies the relationship g(z)=b^(z)/a^(z), where b^(z) and a^(z) are estimates of the channel zeros and poles, respectively. The circuit arrangement is similar to that of FIG. 3, with the sole exception that the initial condition of the filter 105 is obtained by solving a system of equations. The processing module 104 is arranged to perform this calculation and does not have a filter structure. The processing module may be any suitable processing means, including software controlled arrangements such as microprocessor, microcomputer, or custom built circuitry. The equation system is described as follows.

The initial condition of filter 105 is denoted by $d_k$ and the transfer response of the FIR filter 105 denoted by $g_k$. A matrix gm is defined as $gm_{i,j}=g_{i+k}$. The estimated tail or transient signal is denoted by $y_{est}$. Then the initial condition is defined as $$y_{est}=gm \cdot d_k$$

$d_k$ can thus be calculated as $$gm/y_{est},$$

where the operator '/' denotes matrix division.

Depending on the number of elements in $d_k$ and $y_{est}$, the equation system can be either determined or over-determined. The transient signal $y_{est}$ is the signal isolated from the cyclic prefix CP of the received symbol and will thus depend on the length of the cyclic prefix. In the case of an over-determined system, a mean square error solution can be calculated. If the number of elements in the initial condition, $d_k$ and the transient signal estimate $y_{est}$ is equal, the matrix gm will be square and can be inverted. Then $d_k$ can be calculated as $$d_k=gm^{-1} \cdot y_{est}$$

The inversion of gm need be calculated only once, while the matrix multiplication must be performed for each received symbol.

Figure 5:
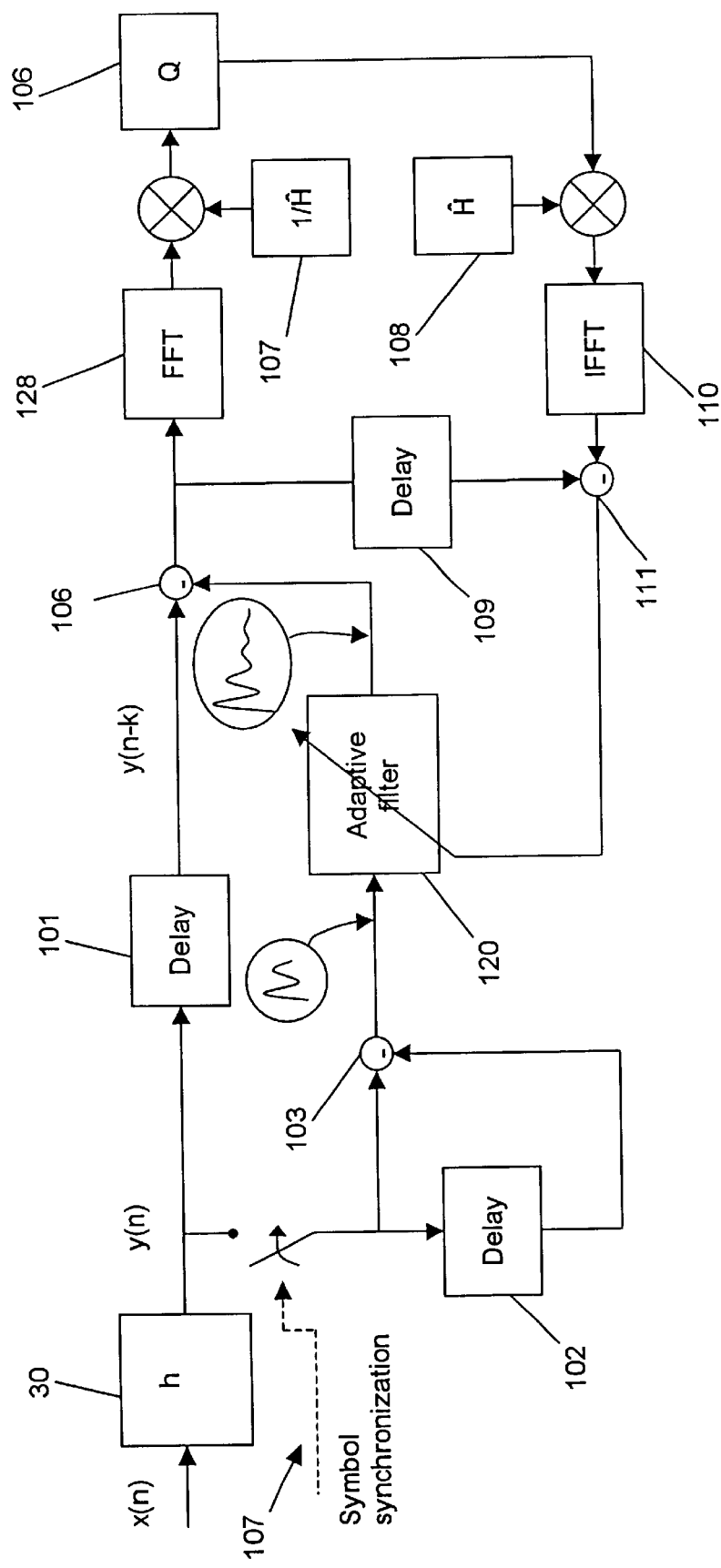
FIG. 5 depicts an arrangement for estimating and cancelling ISI at a receiver in accordance with another embodiment of the present invention.

An arrangement according to a further embodiment of the invention is schematically depicted in FIG. 5. In this arrangement an adaptive filter 120 is used to generate a full transient signal from the transient signal portion contained in the cyclic prefix 110. The advantage of this arrangement is that it is not necessary to know the impulse response of the channel 30. In common with the arrangement of FIG. 4, this circuit comprises the channel 30 with channel response h. A delay element 101 for delaying the received DMT symbols. A switch 107 for synchronising the tail estimation with the received symbols. As before, this switch feeds the cyclic prefix of each received symbol to the tail estimation circuitry and then opens until the final portion of the symbol, of the same length as the cyclic prefix, is received. This is then also fed to the tail estimation circuitry. A delay circuit 102 delays the cyclic prefix until the final symbol portion is received whereupon the two are added in adder 103 to substantially remove the information content from the transient signal portion. This latter portion is then input into an adaptive filter 120, which, after suitable training, generates an estimate of the full transient signal. The estimated full transient signal is fed to adder circuit 106, which simultaneously receives first bits of the delayed DMT symbol from delay circuit 101.

The adaptive filter 120 may be trained initially using a special training sequence followed by silence. The filter design can then be frozen and used as an unchanging transfer function. Alternatively, and as illustrated in FIG. 5, the filter may be adapted using an error signal generated from each received symbol. Because the symbols will be received without intervals, an error signal present in each symbol must be generated. This is achieved by storing each received symbol that has been corrected by subtraction of the tail estimate in a delay buffer 109, while the symbol is simultaneously transformed back to the frequency domain using the fast Fourier transform demodulator 128, decoded using the frequency domain equalizer 107, and quantizer 106 and then subsequently encoded using the reverse function 108 of the frequency domain equalizer 107 and transformed back to the time domain using an inverse fast Fourier transform modulator 110. This decoded signal is then summed with the stored corrected received symbol at adder 111 to generate an error signal that can be used to update the adaptive filter 120.

It will be understood that other arrangements of filter and processing modules may be used to generate a full transient signal using the extracted transient portion. For example, an arrangement based on the embodiment depicted in FIG. 4 using two filter arrangements 104, 105 may be envisaged, wherein both filters are adaptive to provide enhanced performance.

What is claimed is:

1. In a multi-carrier transmission system wherein digital symbols including a cyclical symbol prefix extension are transmitted over a transmission medium to a receiver, a method of compensating for intersymbol interference in symbols received at the receiver, the method comprising the steps:

subtracting the symbol prefix from the beginning of each received symbol to obtain a portion of a transient intersymbol interference signal generated during transmission, providing a filter function and applying said filter function to the transient signal portion to generate at least an estimate of said full transient signal, and correcting each received symbol by subtracting said generated full transient estimate from each received symbol.

2. A method as claimed in claim 1, wherein said symbol extension consists of a cyclic extension of an end portion of each symbol added to the beginning of each symbol.

3. A method as claimed in claim 1, wherein said filter function comprises a first filter function and the step of using said transient portion with said filter function comprises:

calculating initial conditions of said first filter function using said transient portion, setting the initial conditions in said first filter function and inputting a predetermined value into said first filter function to generate said full transient signal.

4. A method as claimed in claim 3, wherein said predetermined value is zero.

5. A method as claimed in claim 3, wherein said filter function comprises a second filter function for calculating the initial conditions of said first filter function using said transient portion.

6. A method as claimed in claim 5, wherein said first filter function is a model of the poles in an impulse response of the transmission medium and said second filter function is a model of an inverse of poles in the impulse response of the transmission medium.

7. A method as claimed in claim 6, further comprising:

performing said first filter function with a transposed direct form II filter structure and performing said second filter function with a finite impulse response filter.

8. A method as claimed in claim 3, wherein said first filter function represents the impulse response of the transmission medium.

9. A method as claimed in claim 8, wherein the step calculating said initial conditions includes the equation system:

$$d_k=gm^{-1}/y_{est},$$

where $d_k$ is the initial conditions, gm is a matrix of said first filter function $g_k$ and is defined as $gm_{ij}=g_{i+j}$, and $y_{est}$ is said full transient signal.

10. In a multi-carrier transmission system wherein digital symbols including a symbol prefix are transmitted over a transmission medium to a receiver, a method of compensating for intersymbol interference at the receiver, comprising the steps of:

subtracting the symbol prefix from the beginning of each received symbol to obtain a portion of a transient intersymbol interference signal generated during transmission, providing an adaptive filter function and subjecting said transient portion to said adaptive filter function for generating at least an estimate of said full transient signal, and correcting each received symbol by subtracting said generated full transient estimate from each received symbol.

11. A method as claimed in claim 10, further comprising the step of:

training said adaptive filter function with a training sequence prior to subjecting said transient portion to said filter function.

12. A method as claimed in claim 10, further comprising the step of:

generating an error signal from each received symbol and correcting said adaptive filter function with each error signal.

13. A method as claimed in claim 11, wherein said symbol prefix is a cyclic prefix consisting of a cyclic extension of an end portion of each symbol joined to the beginning of each symbol.

14. An arrangement in a receiver for compensating for intersymbol interference in received symbols resulting from digital symbols including a cyclical symbol prefix being transmitted over a transmission medium, the arrangement comprising means for subtracting said symbol prefix from a first portion of the received symbols to isolate a portion of a transient signal generated during transmission, filter means for generating an estimate of the transient signal using said transient signal portion, and means for subtracting said transient signal estimate from each received symbol.

15. An arrangement as claimed in claim 14, wherein said means for subtracting said symbol prefix from a first portion of the received symbols comprise sampling means for sampling a first portion and a last portion of the received symbols, said first and last portions being of the same size, delay means for storing said first portion of the received symbol, and subtraction means for subtracting said last sampled portion from said stored first portion of the received symbol.

16. An arrangement as claimed in claim 14, wherein said filter means include processing means and a filter, said processing means being arranged to receive said transient signal portion from a received symbol and to generate values representing initial conditions for said filter, and said filter is arranged to receive a predetermined value as input for generating said transient signal estimate when said generated initial conditions are set.

17. An arrangement as claimed in claim 16, wherein said predetermined value is zero.

18. An arrangement as claimed in claim 16, wherein said first processing means is a finite impulse response filter representing a model of an inverse of poles of a transmission medium impulse response and said filter represents a model of the poles of the impulse response of the transmission medium.

19. An arrangement as claimed in claim 16, wherein said filter has a transposed direct form II structure, with delay elements that are adapted to receive said values representing initial conditions.

20. An arrangement as claimed in claim 16, wherein said filter means comprises a finite impulse response (FIR) filter, and wherein said first processing means are arranged to calculate values setting initial conditions for said FIR filter using the equation system:

$$d_k = gm^{-1} / y_{est},$$

where $d_k$ is the initial conditions, $g_k$ denotes the transfer response of said FIR filter and gm is a matrix defined as $gm_{i,j} = g_{i+k}$, and $y_{est}$ is said transient signal portion.

21. An arrangement in a receiver of a multi-carrier transmission system for compensating for intersymbol interference in received symbols resulting from digital symbols including a cyclical symbol prefix being transmitted over a transmission medium, the arrangement comprising:

means for subtracting said symbol prefix from a first portion of the received symbols to isolate a portion of a transient signal generated during transmission, adaptive filter means for generating an estimate of the transient signal from said transient signal portion, means for subtracting said transient signal estimate from each received symbol to generate a corrected received symbol.

22. An arrangement as claimed in claim 21, further comprising means for generating an error signal from a corrected received symbol for updating said adaptive filter means.

23. A multi-carrier transmission system including transmission means for transmitting digital symbols, each symbol including a cyclical symbol prefix, across a transmission medium and receiving means for receiving and decoding received symbols, wherein said receiving means comprise means for subtracting said symbol prefix from a first portion of the received symbols to isolate a portion of a transient interference signal generated during transmission, filter means for generating an estimate of the transient signal using said transient signal portion, and means for subtracting said transient signal estimate from each received symbol to compensate for intersymbol interference.

* * * * *